US009643521B2

(12) United States Patent
Frommann et al.

(10) Patent No.: US 9,643,521 B2
(45) Date of Patent: May 9, 2017

(54) MOTOR VEHICLE

(71) Applicant: GM GLOBAL TECHNOLOGY OPERATIONS LLC, Detroit, MI (US)

(72) Inventors: Markus Frommann, Bingen am Rhein (DE); Oleg Mazur, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/967,719

(22) Filed: Dec. 14, 2015

(65) Prior Publication Data
US 2016/0176322 A1 Jun. 23, 2016

(30) Foreign Application Priority Data
Dec. 20, 2014 (DE) .................. 10 2014 019 310

(51) Int. Cl.
| *B60N 2/427* | (2006.01) |
| *B60N 2/02* | (2006.01) |
| *B60N 2/06* | (2006.01) |
| *B60R 21/207* | (2006.01) |
| *B60N 2/00* | (2006.01) |
| *B60R 21/00* | (2006.01) |

(52) U.S. Cl.
CPC ......... *B60N 2/42709* (2013.01); *B60N 2/002* (2013.01); *B60N 2/0276* (2013.01); *B60N 2/06* (2013.01); *B60N 2/42718* (2013.01); *B60R 21/207* (2013.01); *B60R 2021/0053* (2013.01); *B60R 2021/2078* (2013.01)

(58) Field of Classification Search
CPC .... B60N 2/42709; B60N 2/0276; B60N 2/06; B60N 2/42718; B60N 2/002; B60R 21/207; B60R 2021/0004; B60R 2021/0032; B60R 2021/0053; B60R 2021/2078
See application file for complete search history.

(56) References Cited

U.S. PATENT DOCUMENTS 5,466,001 A * 11/1995 Gotomyo ................. B60N 2/02
280/730.1

FOREIGN PATENT DOCUMENTS

| DE | 102011122203 A1 | 6/2013 |
| EP | 0949115 A1 | 10/1999 |

(Continued)

OTHER PUBLICATIONS

German Patent Office, German Search Report for German Application No. 102014019310.1, dated Sep. 18, 2015.

*Primary Examiner* — Yuen Wong
(74) *Attorney, Agent, or Firm* — Lorenz & Kopf, LLP.

(57) ABSTRACT

A motor vehicle, encompassing a body, a drive motor, in particular an internal combustion engine and/or an electric motor, a crash detection device, a computing unit, at least one front seat with a seat part and a back part, at least one rear seat with a seat part and a back part, at least one rearward displacement device for the at least partial rearward displacement of the at least one front seat during a pre-crash phase acquired by the crash detection device, wherein the seat part of the at least one rear seat has built into it a first means for lifting up the legs of an individual on the at least one rear seat during the pre-crash phase, and the back part of the at least one front seat has built into it a second means for the rearward movement of the legs of the individual on the at least one rear seat during the pre-crash phase.

8 Claims, 6 Drawing Sheets

(56) References Cited

FOREIGN PATENT DOCUMENTS

| | | | |
|---|---|---|---|
| JP | 2005126944 A | 5/2005 |
| JP | 2005263076 A | 9/2005 |
| JP | 2006159979 A | 6/2006 |

* cited by examiner

MOTOR VEHICLE

CROSS-REFERENCE TO RELATED APPLICATION

This application claims priority to German Patent Application No. 102014019310.1, filed Dec. 20, 2014, which is incorporated herein by reference in its entirety.

TECHNICAL FIELD

The present disclosure pertains to a motor vehicle and a method for operating a motor vehicle.

BACKGROUND

Motor vehicles exhibit an interior, and seats are arranged inside the interior. Front seats here exhibit a seat part and a back part, wherein the back part can pivot around a pivoting axis. Rear seats are arranged in back of the front seats inside the interior of the vehicle. The rear seats are here generally combined into a rear seat bench comprised of three rear seats. The back part of the front seats exhibits a front side on a back surface, and a rear side opposite the front side. The rear side of the back part of the front seats here poses a limitation to the knees of individuals or passengers on the rear seats. A partial area of the interior on the rear side of the back part thus represents legroom, within which the legs of individuals are arranged on the rear seats.

Motor vehicles with a crash detection device acquire the distance to the environment of the motor vehicle, allowing a computing unit to detect an impending accident. Starting from the time this impending accident is detected, a pre-crash phase begins and lasts up until the actual collision of the motor vehicle with the environment or up until the accident, and a rearward displacement device can be used during the pre-crash phase to move the front seat of the motor vehicle toward the back around a rearward displacement path, so that individuals on the front seats are farther away from the dashboard and steering wheel, for example, making it possible to better protect these individuals against injury on the front seats. However, if an individual is seated on the rear seat behind the front seat that is moved toward the back with the rearward displacement device during the pre-crash phase, it reduces the legroom for this individual. This can increase the risk of injury to individuals on the rear seats, in particular to their legs.

Known from DE 10 2011 122 203 A1 is a retaining device for a motor vehicle. The retaining device can be used for a rearward displacement to displace a vehicle passenger toward the back over a rearward displacement path opposite the traveling direction in a pre-crash phase before the time of a potential accident.

SUMMARY

Therefore, embodiments of the present invention provide a motor vehicle and a method for operating a motor vehicle in which the front seat can traverse a large rearward displacement path during a pre-crash phase without resulting in a risk of injury to the legs of an individual behind this front seat.

Within a motor vehicle encompassing a body, a drive motor, in particular an internal combustion engine and/or an electric motor, a crash detection device, a computing unit, at least one front seat with a seat part and a back part, at least one rear seat with a seat part and a back part, at least one rearward displacement device for the at least partial rearward displacement of the at least one front seat during a pre-crash phase acquired by the crash detection device, wherein the seat part of the at least one rear seat has built into it a first means for lifting up the legs of an individual on the at least one rear seat during the pre-crash phase, and the back part of the at least one front seat has built into it a second means for the rearward movement of the legs of the individual on the at least one rear seat during the pre-crash phase. The first means makes it possible to lift or move the legs up during the pre-crash phase, in particular the thighs, while the second means makes it possible to move the legs, in particular the shanks of the legs, toward the back, thereby putting the legs in a position where a large rearward displacement path of the front seat can be traversed without the rear side of the back part of the front seat coming into contact with the legs of an individual on the rear seat. This allows the front seat to traverse a larger rearward displacement path, so that the risk of injury to individuals on the front seat can on the one hand be improved without this resulting in an increased risk of injury to individuals on the rear seats. The boundary of the back part of the front seat as viewed toward the back is regarded as a rear side of the back part, and the latter can also consist of the second means, for example a second airbag or second part.

In particular, the computing unit can be used to initially activate the first means, and subsequently the second means. Due to the kinematics of the upper and lower thigh with the knee of the legs, it is necessary to first move the legs up with the first means, in particular the thighs, and then move the legs toward the back with the second means, in particular the shanks, so that the legs are spaced apart from the floor, and the shanks can swing freely around the knee. The first and second means can here also be activated in part simultaneously. After the first means has been activated and while activating the first means, the second means can be activated in the end phase of activating the first means.

In another embodiment, the computing unit can be used to initially activate the first and/or second means, and the rearward displacement device can subsequently and/or simultaneously be activated. As a consequence, the first and/or second means is initially activated, after which the rearward displacement device is activated. When starting to activate the rearward displacement device, the first and second means have already at least partially moved the legs into the end position, thereby making a larger rearward displacement path available for the front seat.

In a supplementary embodiment, a sensor system can be used to acquire the position of the legs of the individual on the at least one rear seat, and, depending on the acquired position of the legs, the rearward displacement of the at least one front seat can be performed with the rearward displacement device.

The computing unit can preferably calculate an available rearward displacement path for the at least one front seat as a function of the acquired position of the legs, and the actual rearward displacement path of the at least one front seat is at most the available rearward displacement path. The sensor system acquires the position of the legs, and the available rearward displacement path for the front seat is calculated from this acquired position of the legs. In particular, the legs are here situated in an end position, which was made available by the first and second means. This enables a large available rearward displacement path for the at least one front seat. However, the actual rearward displacement path can be smaller than the available rearward displacement path.

In a supplementary embodiment, the belt can be tightened on the rear seat with a belt tensioner, wherein the belt can be tightened on the rear seat with the belt tensioner in particular before the activation of the first and/or second means.

In another variant, an occupancy sensor can be used to acquire the occupancy of the at least one rear seat by an individual, and if an individual is on the at least one rear seat, the first and second means assigned to this rear seat can only be activated in particular in this case, preferably if an individual is situated on the front seat in front of the rear seat. The second means assigned to this rear seat is here the second means arranged on the front seat in front of the individual in the front seat, and the assigned first means is the first means incorporated or integrated into the rear seat on which the person behind the front seat is situated. It is expedient for the at least one front seat to also encompass an occupancy sensor.

It is expedient for the first means to be a first airbag or a first part of the seat part of the at least one rear seat and/or the second means to be a second airbag or a second part of the back part of the at least one front seat. The first and/or second airbag can be inflated or deployed by a gas generator. The first and/or second airbag is here inflated or deployed slowly or at a speed that avoids unnecessary risks of injury to the individual on the rear seat while being fast enough to enable inflation or deployment during the pre-crash phase. The first part is a part of the seat part of the at least one rear seat, and the second part is a part of the back part of the at least one front seat. For example, the first and/or second part can be moved electromotively and/or pneumatically and/or hydraulically or is movable. For example, the first means lifts a cushion and/or seat cover of the seat part of the rear seat, and the second means moves the rear surface of the back part of the front seat toward the back. The second means here either comprises the rear side itself, or a fabric cover on the rear side of the back part of the front seat is moved toward the back by the second means. The second means and preferably the first means as well are thus reversible, and need not be replaced after an accident. As a result, a part of the rear surface is moved toward the back, and this part of the rear surface can be moved back into the original starting position again after the accident.

In another embodiment, the motor vehicle encompasses two front seats, wherein each of the two front seats has built into it a second means, and the motor vehicle encompasses two rear seats, wherein each of the two rear seats, which are situated behind the two front seats, has built into it a first means, and/or a method described in this application for a protective right can be implemented with the motor vehicle.

A method according to embodiments of the invention for operating a motor vehicle, in particular a motor vehicle described in this application for a protective function provides: acquiring an impending accident of the motor vehicle with a crash detection device, so that a pre-crash phase is started from the time the impending accident was detected until the accident, activating a rearward displacement device for a front seat in the pre-crash phase, so that the front seat is moved toward the back during the pre-crash phase, wherein a first means lifts up the legs of an individual on the rear seat during the pre-crash phase, and a second means moves the legs of the individual on the rear seat toward the back during the pre-crash phase. The control unit controls and/or regulates, i.e., activates and/or deactivates, the first means and/or the second means and/or the rear displacement device and/or the belt tensioner.

In another embodiment, the first means is initially activated, and the second means is subsequently and/or simultaneously activated and/or the first means is activated in the rear seat, in particular the seat part of the rear seat, and/or the second means is activated in the front seat, in particular the back part of the front seat.

In particular, the rearward displacement device is initially activated, and the front seat is moved toward the back, and the first and/or second means is subsequently and/or simultaneously activated, and/or the first means is used to move up the seat surface of the seat part of the rear seat, and/or the second means is used to move the rear side of the back part of the front seat toward the back.

In another embodiment, the first means is moved up from the seat part of the rear seat during activation, thereby increasing the distance between the first means and remaining seat part of the rear seat in a vertical direction, and/or the second means is moved toward the back from the back part of the front seat during activation, thereby increasing the distance between the second means and the remaining back part of the front seat in a horizontal direction.

In a supplementary variant, the first means is an inflatable first airbag or a first part of the seat part of the rear seat, and/or the second means is an inflatable second airbag or a second part of the back part of the front seat.

In another variant, the first and/or second airbag exhibits at least one opening, so that while and after activating and inflating the first and/or second airbag, gas is relayed out of the at least one opening. After the first and/or second airbag has been completely deployed or inflated, the opening allows gas to stream out of the airbag, thereby reducing the volume of the airbag, in particular of the second airbag, during a rearward displacement of the front seat, and allowing an additional rearward displacement path for the front seat without major forces from the airbag acting on the legs of the individual on the rear seat.

In another embodiment, a sensor system is used to acquire the position of the legs of the individual on the rear seat, and, depending on the acquired position of the legs, the front seat is displaced toward the back with the rearward displacement device; in particular, the more legroom is acquired between the legs and front seat, the longer the rearward displacement path over which the front seat is moved toward the back and vice versa.

In an additional embodiment of a motor vehicle with three rows of seats, i.e., seats in a first row, seats in a second row and seats in a third row, the seats in the second row are regarded as front seats, and the seats in the third row are regarded as rear seats. In this motor vehicle with three rows of seats, the seats in the second row thus exhibit the first and second means, and a rearward displacement device can be used to move the seats in the second row toward the back, and the seats in the third row only exhibit the first means. Further, in this motor vehicle with three rows of seats, the seats in the first row are also regarded as front seats, i.e., the seats in the first row exhibit the second means and rearward displacement device, and the seats in the second row are also regarded as rear seats, i.e., the seat in the second row exhibits the first means.

The invention further encompasses a computer program with program code, which is stored on a computer-readable data carrier, so as to implement a method described in this application for a protective right when the computer program is run on a computer or corresponding computing unit.

Another constituent of the invention is a computer program product with program code means stored on a computer-readable data carrier, so as to implement a method described in this application for a protective right when the computer program is run on a computer or a corresponding computing unit.

In another embodiment, the sensor system for acquiring the position of the legs, in particular of the knee, of the individual on the rear seat is a radar and/or an ultrasound sensor and/or a camera with an image acquisition system and/or a reader and/or an infrared device.

In a supplementary variant, the crash detection device encompasses a sensor, in particular a sensor on the front end area of the motor vehicle, for acquiring the distance between the motor vehicle and the environment; for example, this sensor is a radar and/or an optical sensor and/or an ultrasound sensor. A speed sensor of the crash detection device acquires the speed of the motor vehicle, and the computing unit uses the data from the sensor and speed sensor to calculate the time of a future accident and the start of the pre-crash phase. For example, the speed sensor is such that the computing unit evaluates a wheel speed or GPS position of the motor vehicle, and calculates the speed from the latter.

In an additional embodiment, the sensor system, preferably at least one sensor of the sensor system, is incorporated or integrated into a back part of a seat, in particular of a front seat, to acquire the position of the legs of an individual.

In another embodiment, the occupancy sensor is a sensor for acquiring the occupancy by an individual of the seat, in particular the front seat and/or the rear seat, a sensor for acquiring a force acting on the seat surface and/or a radar sensor.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
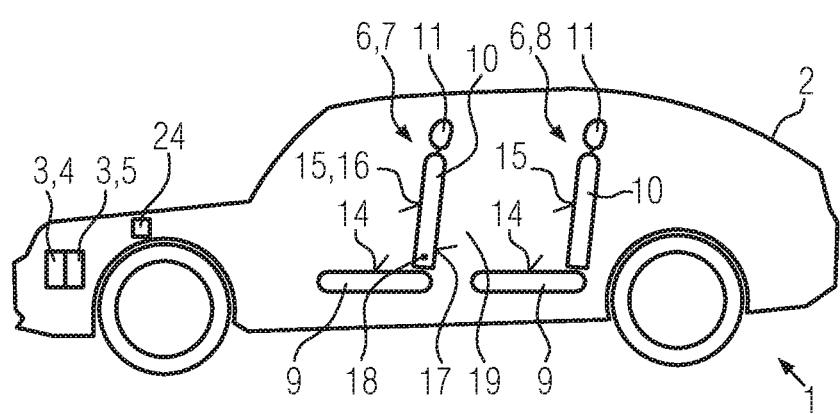
FIG. 1 is a side view of a motor vehicle.
Figure 2:
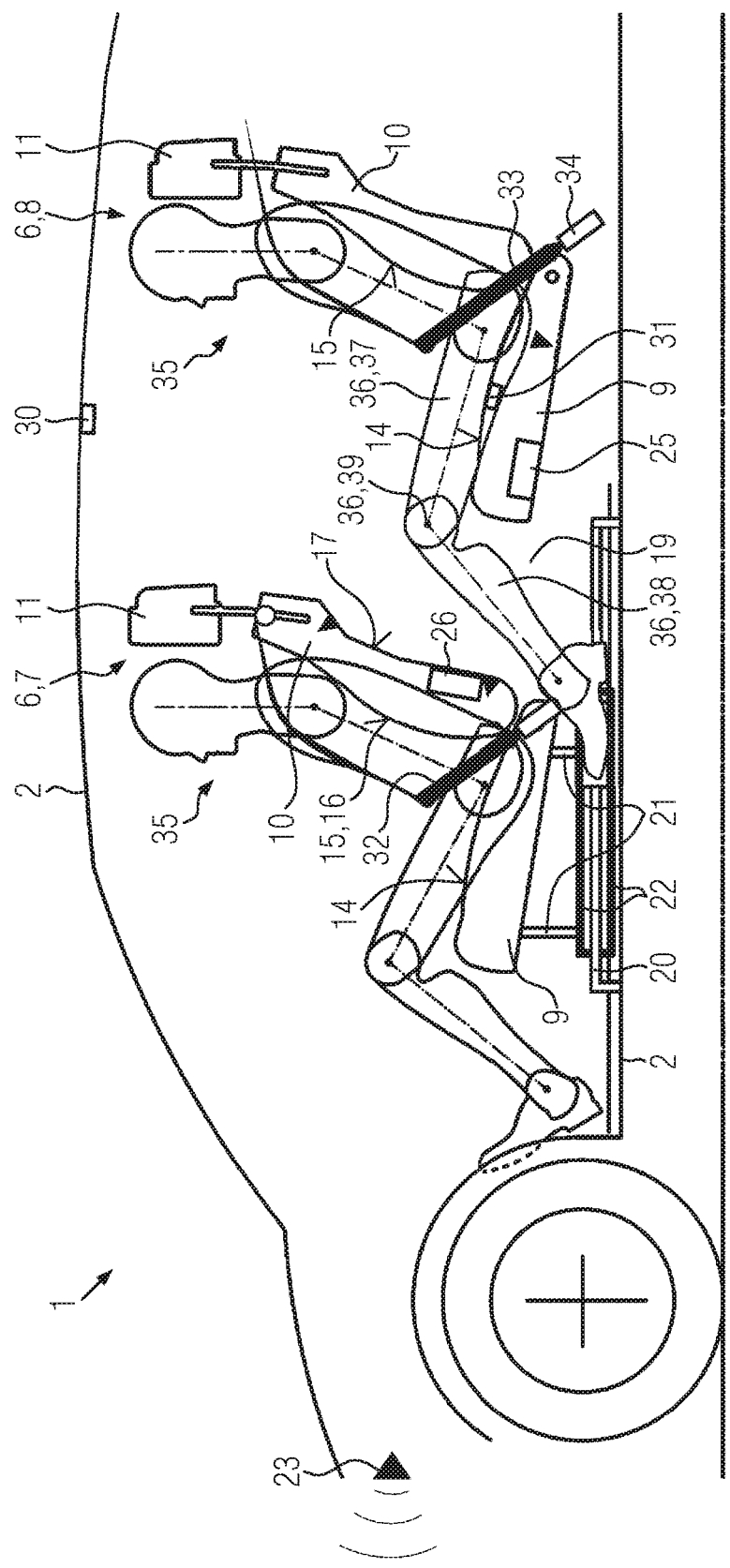
FIG. 2 is a highly simplified partial longitudinal section of the motor vehicle in a first exemplary, embodiment at a first point in time of a pre-crash phase.

A motor vehicle 1 shown on FIG. 1 exhibits a body 2 made out of metal, in particular steel and/or composite. A drive motor 3, for example an electric motor 4 and/or an internal combustion engine 5, moves the motor vehicle 1. The body 3 borders an interior, the interior has arranged within it two front seats 7 in a first row as seats 6 along with three rear seats 8 in a second row as seats 6. The three rear seats 8 are here combined into a seat bench.

FIGS. 1 to 5 present a longitudinal section through the front seat 7. The front seat 7 encompasses a seat part 9 and a back part 10. The seat part 9 and back part 10 each exhibit a bearing structure (not shown), to which a cushion and seat cover (not shown) are fastened. A headrest 11 is also fastened to the back part 10. The seat part 9 is fastened to a rail 20 by support feet 21 (FIGS. 2 to 5), and the rail 20 is fastened to the body 2. The support feet 21 fastened to the rail 20 can here be used to move the entire front seat 7 in the longitudinal direction of the motor vehicle 1 horizontally toward the back by means of a rearward displacement device 22. The bearing structure of the back part 10 is joined with the bearing structure of the seat part 9 by connecting parts (not shown), as a result of which, during a horizontal movement by the front seat 7, both the seat part 9 and back part 10 together also perform the horizontal movement.

The seat part 9 of the front seat 7 exhibits a seat surface 14 for seating an individual, and the back part 10 of the front seat 7 as the seat 6 exhibits a rear surface 15 for the back of a person 35 on the seat 6 to rest against. At the same time, the rear surface 15 comprises a front side 16 of the back part 10. The back part 10 also exhibits a rear side 17 opposite the front side 16. The back part 10 is mounted so that it can pivot around a pivoting axis 18 (FIG. 1) relative to the remaining motor vehicle 1, and also to the seat part 9. In the area of their knees, individuals 35 or passengers 35 on the rear seats 8 are situated in proximity to or on the rear side 17 of the back part 10, so that an area or partial area of the interior creates legroom 19 on the rear side 17, and the legs 36, in particular to include a knee 39, of individuals 35 on the rear seats 8 are situated inside of the legroom 19 area (FIGS. 2 to 5).

FIGS. 2 to 5 present a first exemplary embodiment of the motor vehicle 1 with the rearward displacement device 22 and a crash detection device 23. The crash detection device 23 acquires an impending accident or a collision between the motor vehicle 1 and the environment. A pre-crash phase of the motor vehicle 1 begins once the acquisition of an impending accident has been initiated. The pre-crash phase ends with the collision of the motor vehicle 1 with the environment. An occupancy sensor 31 acquires the occupancy of the rear seat 8 with the individual, and an occupancy sensor 31 (not shown) also acquires the occupancy of the front seat 7 with the individual 35. A sensor system 30 acquires the position of the legs 36 of the individual 35 on the rear seat 8, i.e., the position of a thigh 36, a shank 38 and the knee 39. A first means 25 is incorporated or integrated in the front end area of the seat part 9 of the rear seat 8, namely a first airbag 27. A second means 26 is incorporated or integrated in the area of the rear aide 17 of the back part 10 of the front seat 7, namely a second airbag 28. The rearward displacement device 22 can also be used to move the entire front seat 7 toward the back during the pre-crash phase, i.e., opposite the traveling direction of the motor vehicle 1 toward the rear seat 8. Deviating from the above, the rearward displacement device 22 can also only pivot the back part 10 of the front seat 7 around the pivoting axis 18 toward the back, so that the front seat 7 is partially moved to the back. A belt 32 for the individual 35 on the front seat 7 is also arranged on the front seat 7, and a belt 33 for the individual 35 on the rear seat 8 is further arranged in the area of the rear seat 8. The belt 33 on the rear seat 8 can further be tightened or shortened by means of a belt tensioner 34. The legroom 19 is created between the rear side 17 of the back part 10 of the front seat 7 and the rear seat 8, in particular the seat part 9 of the rear seat 8. The legroom 19 establishes the space available for the legs 35.

Figure 3:
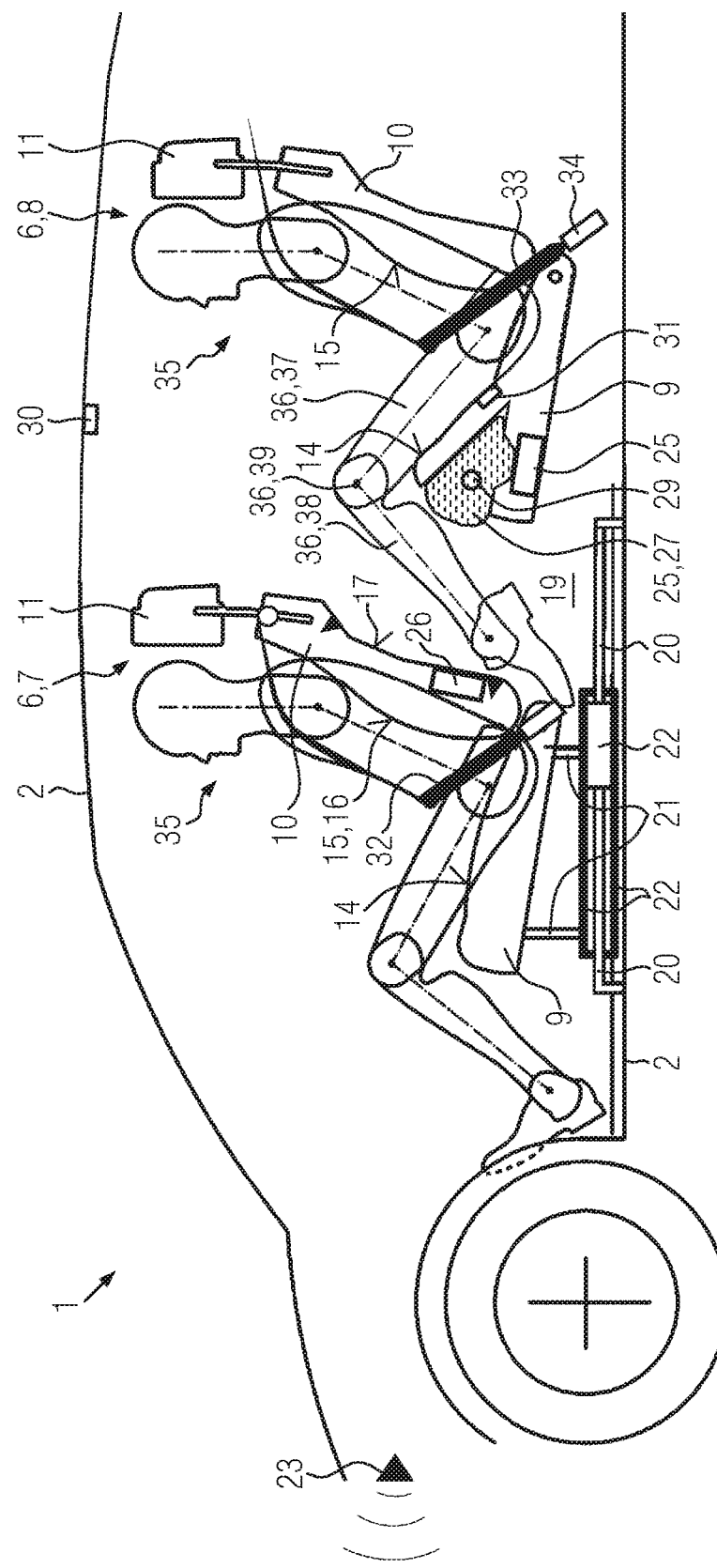
FIG. 3 is a highly simplified partial longitudinal section of the motor vehicle in the first exemplary embodiment at a second point in time of a pre-crash phase.
Figure 4:
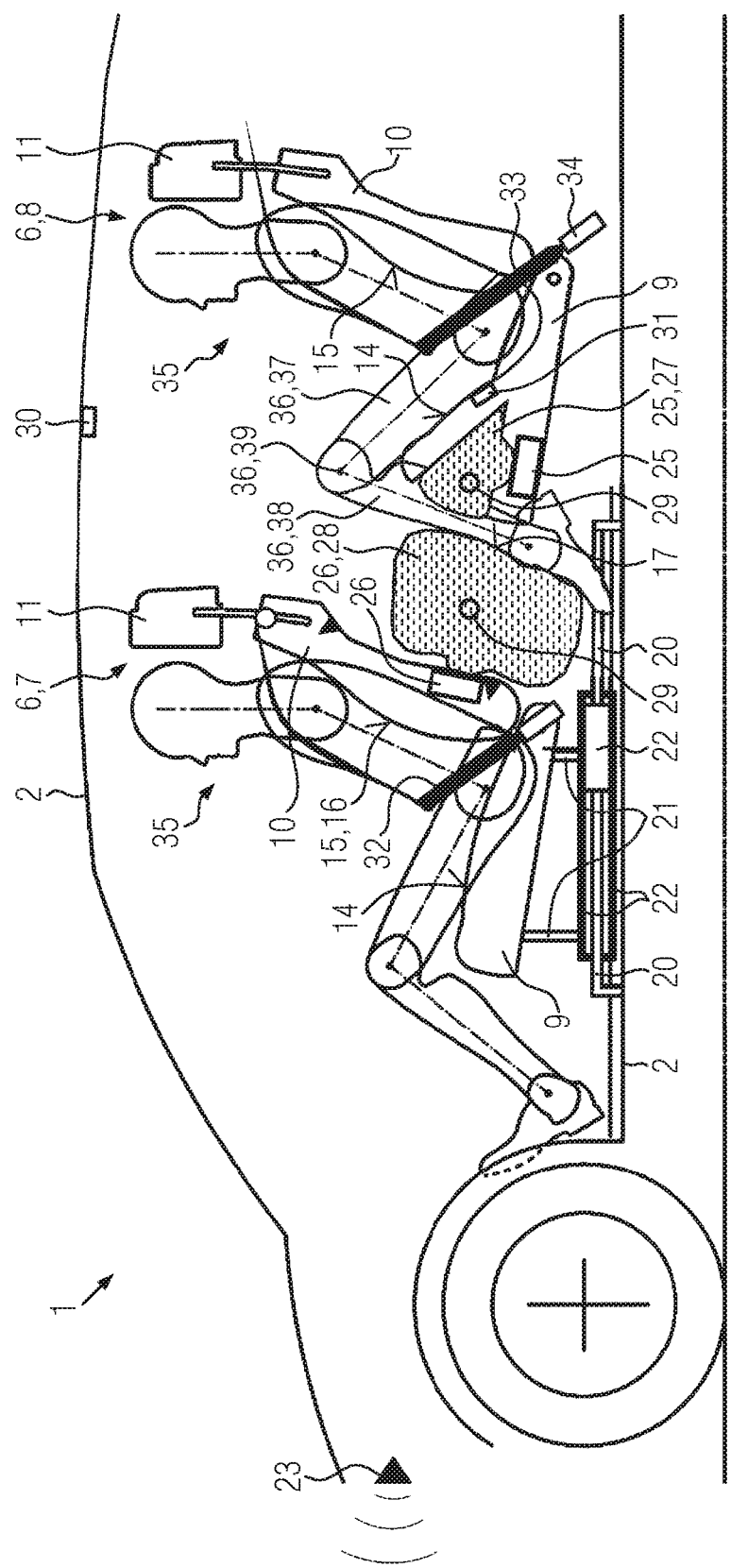
FIG. 4 is a highly simplified partial longitudinal section of the motor vehicle in the first exemplary embodiment at a third point in time of a pre-crash phase.
Figure 5:
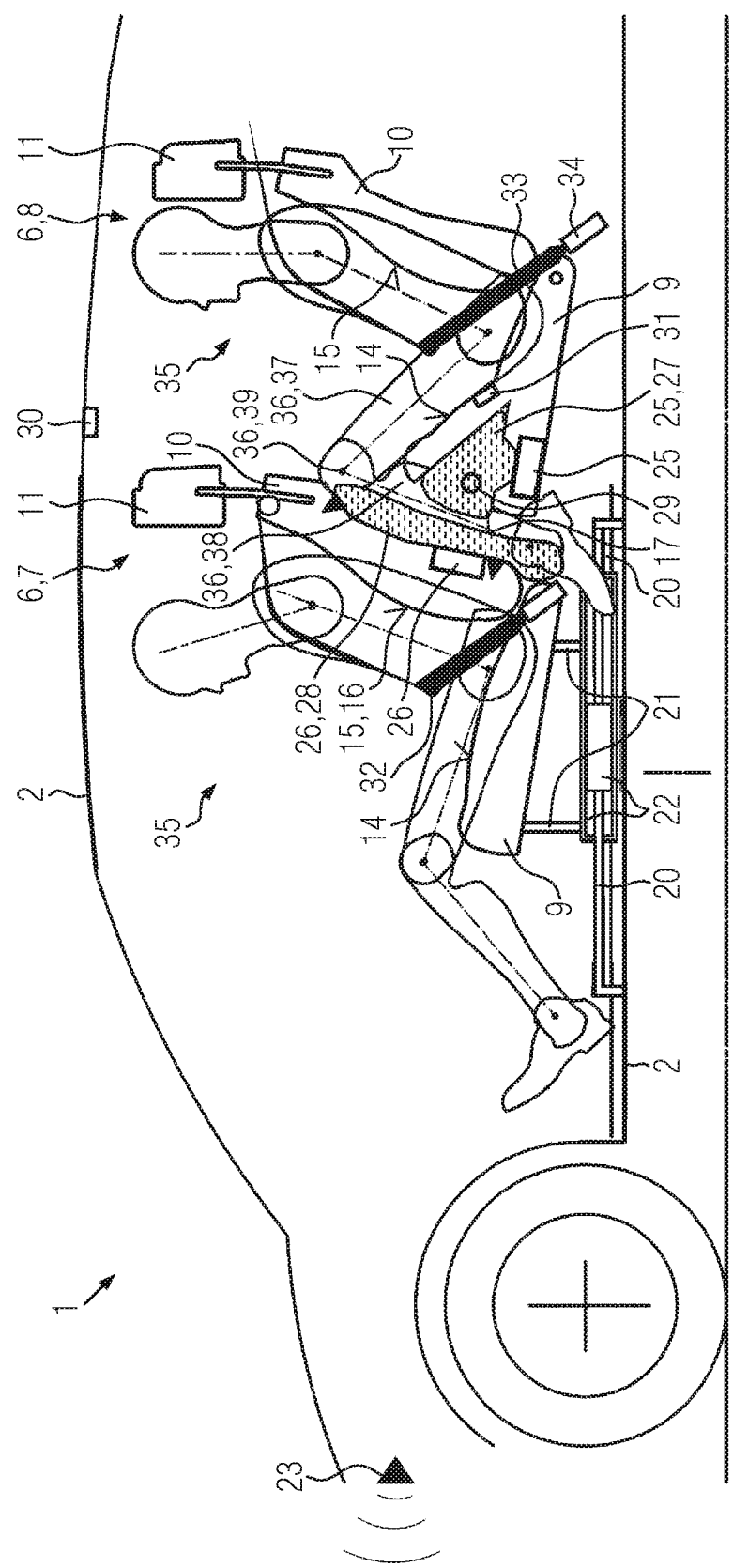
FIG. 5 is a highly simplified partial longitudinal section of the motor vehicle in the first exemplary embodiment at a fourth point in time of a pre-crash phase.

At the start of the pre-crash phase of the motor vehicle 1, which is determined by the crash detection device 23 working together with the computing unit 24, the sensor system 30 initially acquires the position of the legs 36 of the individual 35 on the rear seat 8. The first and second means 25, 26 need only be activated if an individual 35 is situated both on the front seat 7 and on the rear seat 8, which is arranged toward the back or behind the front seat 7. If only one individual is on the front seat 7 and no individual 35 is on the rear seat 8, the computing unit 24 does not activate the first and second means 25, 26 during the pre-crash phase. At the start of the pre-crash phase, the belt tensioner 34 initially tightens the belt 33 on the rear seat 8. The computing unit 24 then activates the first means 25, i.e., the first airbag 27 is slowly inflated by a gas generator (not shown), thereby moving a cushion and seat cover (not shown) at the front end area of the seat part 9 of the rear seat upward in a vertical direction, so that the seat surface 14 of the seat part 9 of the rear seat 8 is also moved up (FIG. 3). As a result, the legs 36, in particular the thighs 37 with the knee 39, of the individual 35 on the rear seat 8 are moved up, so that the legs or feet are spaced apart to the floor or footrest area. The second airbag 28 is then activated as the second means 26, i.e., inflated by a gas generator (not shown) (FIG. 4). The second airbag 28 here also comprises a rear side 17 of the back part 10 of the front seat 7, so that the shanks 38 of the individual on the rear seat 8 are thereby moved in a horizontal direction toward the back or rearward. This makes it possible to increase the available rearward displacement path for the front seat 7. During the pre-crash phase, the rearward displacement device 22 is then used to move the front seat 7 toward the back. The second airbag 28 here exhibits an opening 29, so that the volume of the second airbag 28 decreases as a result as the front seat 7 moves toward the back, making a longer rearward displacement path available for the front seat 7. However, the opening 29 can also be designed to allow the gas to escape through the fabric of the second airbag 28. The first airbag 27 preferably also exhibits the opening 29, the size of the opening 29 on the second airbag 28 is preferably significantly larger than on the first airbag 27. In the second airbag 28, it is necessary that the gas partially flow out of the second airbag 28 for a brief period during the rearward displacement of the front seat 7. The opening 29 on the first airbag 27 only causes the gas to slowly flow out of the first airbag 27 after the accident of the motor vehicle 1 is over, and only a negligible amount of gas to flow out of the first airbag 27 during the pre-crash phase, i.e., the volume of the first airbag 27 only diminishes to a negligible extent during the brief period of the pre-crash phase.

Figure 6:
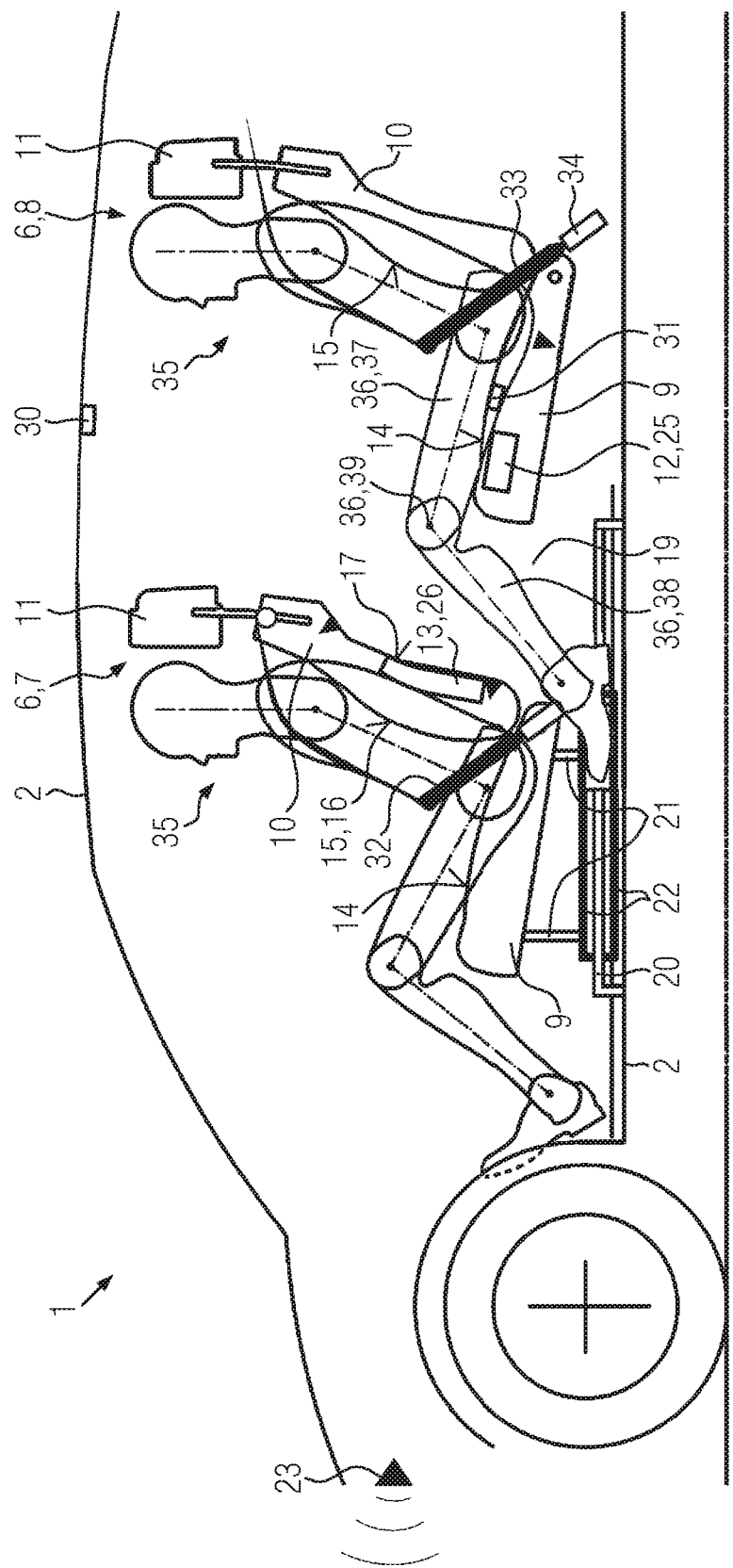
FIG. 6 is a highly simplified partial longitudinal section of the motor vehicle in a second exemplary embodiment at a first point in time of a pre-crash phase.

FIG. 6 shows a second exemplary embodiment of the motor vehicle 1. Essentially only the differences from the first exemplary embodiment shown on FIGS. 2 to 5 will be described below. FIG. 6 shows the motor vehicle 1 at the start of the pre-crash phase. The first and second means 26, 27 have here not been activated yet. For example, the first means 25 is a first part 12 as a part of the seat part 9 of the rear seat 8, and the second part 13 is part of the back part 10 of the front seat 7. For example, the first part 12 is a plate underneath a cushion and the seat cover (not shown) of the seat part 9 of the rear seat 8. The second part 13 is also a plate on the rear side 17 of the back part 10 of the front seat 7. The first and second part 12, 13 can be moved in the corresponding direction electromotively and/or pneumatically, for example with an electric motor and/or a pneumatic piston. A cushion is also arranged on the second part 13, so that the rear side 17 on the second part 13 is soft for purposes of resting the legs 16.

Viewed in overall terms, significant advantages are associated with the motor vehicle 1 according to embodiments of the invention and the method for operating the motor vehicle 1 according to the invention. The computing unit 24 acquires a pre-crash phase with the crash detection device 23. During the pre-crash phase, the computing unit 24 activates the belt tensioner 34, the first and/or second means 25, 26, and activates and/or deactivates or controls and/or regulates the rearward displacement device 22. By activating the first and second means 25, 26, the legs 36 of the individual 35 on the rear seat 8 can be moved into a position that provides a large rearward displacement path for the front seat 7. The front seat 7 can thereby trace a large rearward displacement path in the pre-crash phase with the rearward displacement device 22, so that the safety of individuals on the front seats 7 is improved on the one hand, and the risk of injury to individuals 35 on the rear seats 8 resulting from the above is simultaneously not increased, since the position of the legs 36 prevents them from being exposed to any elevated risk of injury on the front seat 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle, comprising:
    a body;
    a drive motor, comprising at least one of an internal combustion engine and an electric motor;
    a crash detection device;
    a computing unit;
    at least one front seat with a seat part and a back part;
    at least one rear seat with a seat part and a back part; and
    at least one rearward displacement device for at least partial rearward displacement of the at least one front seat during a pre-crash phase acquired by the crash detection device,
    wherein the seat part of the at least one rear seat has a first inflatable member for lifting up legs of an individual on the at least one rear seat during the pre-crash phase, and the back part of the at least one front seat has a second inflatable member for pushing the legs of the individual rearward during the pre-crash phase.

2. The motor vehicle according to claim 1, wherein the computing unit is configured to initially activate the first inflatable member, and subsequently the second inflatable member.

3. The motor vehicle according to claim 1, wherein the computing unit is configured to initially activate the first inflatable member and/or the second inflatable member, and wherein the at least one rearward displacement device is configured to subsequently and/or simultaneously be activated.

4. The motor vehicle according to claim 1, wherein a sensor system is configured to acquire the position of the legs of the individual on the at least one rear seat, and, depending on the acquired position of the legs, the rearward displacement of the at least one front seat is performed with the at least one rearward displacement device.

5. The motor vehicle according to claim 1, wherein the computing unit is configured to calculate an available rearward displacement path for the at least one front seat as a function of the acquired position of the legs, and an actual rearward displacement path of the at least one front seat is at the most available rearward displacement path.

6. The motor vehicle according to claim 1, wherein an occupancy sensor is configured to acquire an occupancy of the at least one rear seat by the individual, and when the individual is on the at least one rear seat, the first inflatable member and the second inflatable member assigned to the occupied rear seat only are activated.

7. The motor vehicle according to claim 1, wherein the first inflatable member is a first airbag, and
the second inflatable member is a second airbag.

8. The motor vehicle according to claim 1, wherein the motor vehicle encompasses two front seats, wherein the back part of each of the two front seats has a respective second inflatable member, and the motor vehicle encompasses two rear seats, wherein each of the two rear seats is situated behind a respective one of the two front seats and has a respective first inflatable member.

* * * * *